H. E. SMITH.
Wringer.

No. 204,852. Patented June 11, 1878.

Witnesses.
Chas. Wahlers.
Otto Hufeland.

Inventor.
Hamilton E. Smith
by
Van Santvoord & Hauff
his attorneys

UNITED STATES PATENT OFFICE.

HAMILTON E. SMITH, OF JERSEY CITY, NEW JERSEY.

IMPROVEMENT IN WRINGERS.

Specification forming part of Letters Patent No. 204,852, dated June 11, 1878; application filed November 6, 1877.

*To all whom it may concern:*

Be it known that I, HAMILTON E. SMITH, of Jersey City, in the county of Hudson and State of New Jersey, have invented a new and useful Improvement in Clothes-Wringers, which improvement is fully set forth in the following specification, reference being had to the accompanying drawings, in which—

Figure 1:
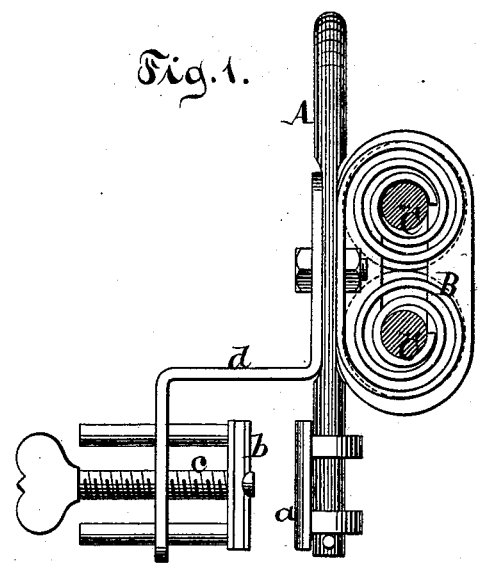
Figure 2:
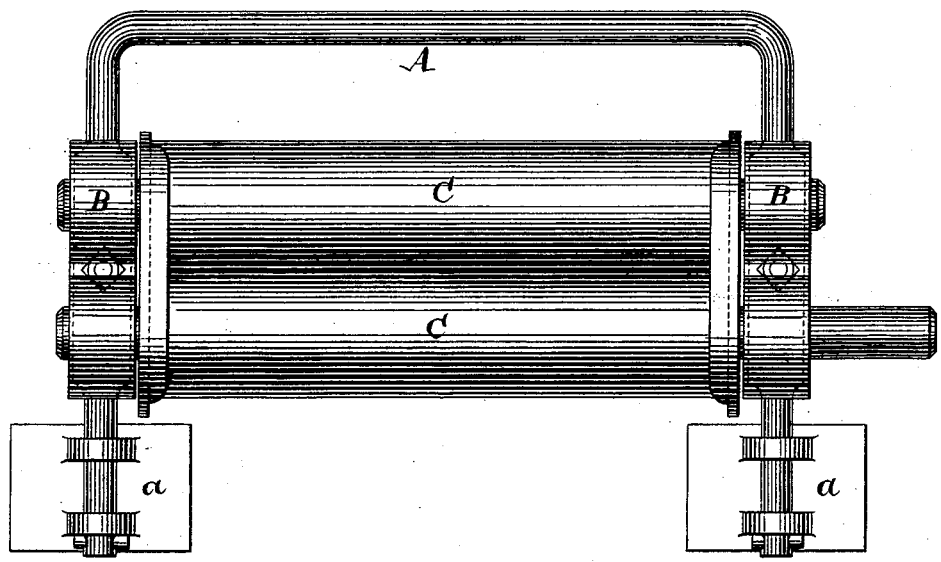

Figure 1 represents an end view. Fig. 2 is a front view.

Similar letters indicate corresponding parts.

This invention consists in the combination, in a clothes-wringer, of two elastic rolls, a frame provided with suitable clamps for securing the wringer to a wash-tub, and two coiled springs, which are secured to the opposite sides of said frame, and the inner rings of which form the bearings for the shaft of both of the elastic rollers, so that by the force of said coiled springs the two rollers are kept in contact, and at the same time permitted to accommodate themselves to the thickness of the material passing through between them, and, furthermore, the construction of the wringer is materially simplified.

In the drawing, the letter A designates the frame of my clothes-wringer, which is composed of a metal bar, bent in the form of the inverted letter U, as shown in Fig. 2. To the end of each of the legs of this U-shaped frame is attached a swivel-jaw, $a$, which co-operates with a sliding jaw, $b$, secured to a screw, $c$, that is tapped into a bracket, $d$, fastened to the frame A, so that by means of said jaws the frame can be readily secured on a wash-tub. On each of the legs of the U-shaped frame is also secured a coiled spring, B, which forms the bearings for the shafts of the elastic rollers C C. Each of the springs B is provided with a double coil, and the shafts of both elastic rollers have their bearings in the inner rings of these coiled springs. The springs B are rigidly fastened to the frame A, and the inner rings of the two coils of each spring are placed at such a distance apart that by the action of said springs the elastic rollers are held in close contact with each other.

By using the inner rings of the coiled springs B for the bearings of the elastic rollers, the labor and expense of making separate boxes and of fitting such boxes to the frame, or to springs which act on the same, are saved, the construction of the wringer is materially simplified, and the elastic rollers are supported in such a manner that they act on the material passing through between them with the requisite force, and that they can readily adapt themselves to the thickness of such material.

What I claim as new, and desire to secure by Letters Patent, is—

The combination, in a clothes-wringer, of two elastic rollers, a frame provided with clamps for securing the wringer to a wash-tub, and two coiled springs secured to each side of the frame, the inner rings of said coiled springs forming bearings for the journals of both the elastic rollers, substantially as and for the purpose described.

In testimony that I claim the foregoing I have hereunto set my hand and seal this 5th day of November, 1877.

HAMILTON E. SMITH. [L. S.]

Witnesses:
 W. HAUFF,
 E. F. KASTENHUBER.